Oct. 22, 1929.　　　I. LIVINGSTON　　　1,732,308
LAWN MOWER ATTACHMENT
Filed Aug. 29, 1925
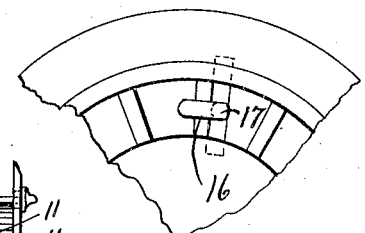
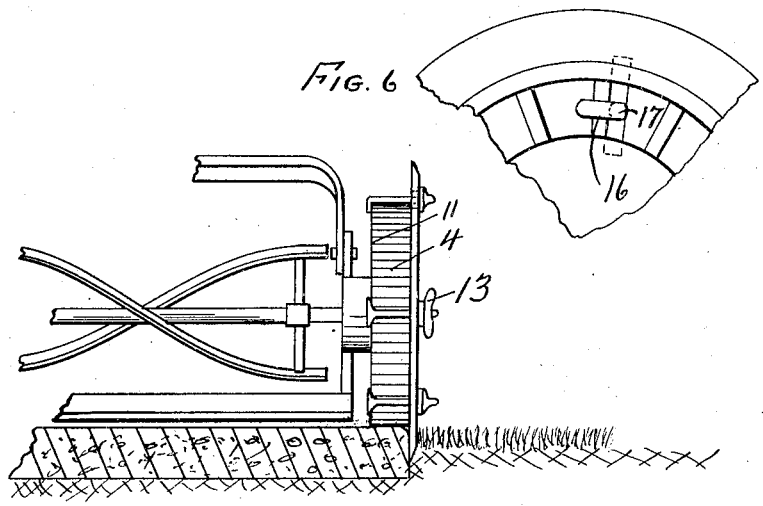
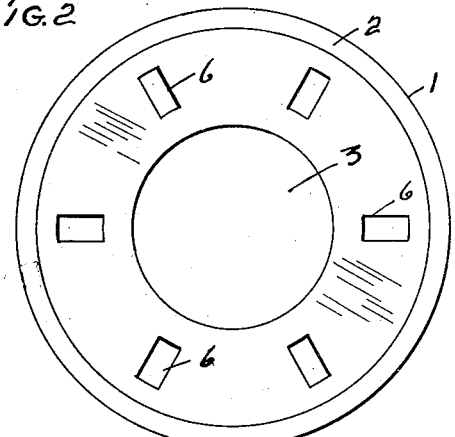
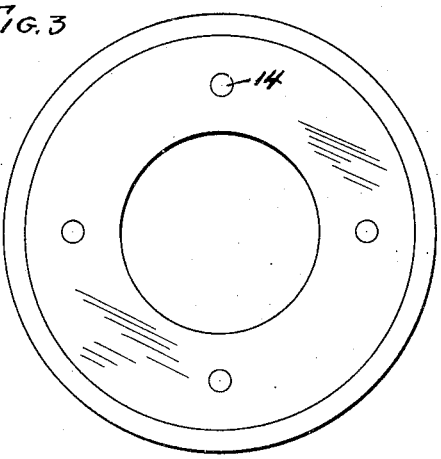
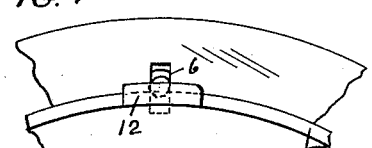
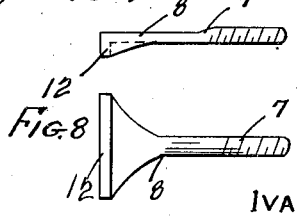
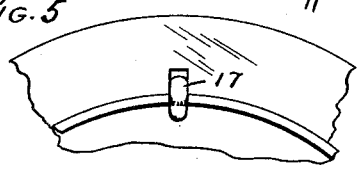
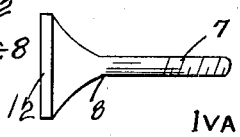
INVENTOR.
IVAN LIVINGSTON
BY
ATTORNEYS.

Patented Oct. 22, 1929

1,732,308

UNITED STATES PATENT OFFICE

IVAN LIVINGSTON, OF OAKLAND, CALIFORNIA

LAWN-MOWER ATTACHMENT

Application filed August 29, 1925. Serial No. 53,300.

The present invention relates to improvements in lawn mower attachments and has particular reference to a detachable means for trimming the edges of a lawn adjacent a concrete sidewalk or other like surface. At such edges, the grass and sod tend to overlie and encroach upon the sidewalk, producing an unsightly appearance which necessitates frequent trimming, which is usually done with a spade or other hand tool. It is particularly proposed in the present invention to provide an attachment that will trim such edges in an expeditious manner and which can be very easily applied and removed. It is further proposed to provide an attachment of this character that is very simple and may be manufactured cheaply.

Further objects and advantages will appear as the specification proceeds.

The preferred form of my invention is illustrated in the accompanying drawing in which:

Figure 1 shows a fragmentary rear view of a lawn mower having my trimming device attached thereto.

Figure 2 is a detail view of my trimming device detached from the lown mower.

Figure 3 is a detail view of a modified form of trimming device.

Figures 4, 5 and 6 are inside views showing different ways of attaching my device to a lawn mower wheel.

Figures 7 and 8 show attaching hooks adapted to be used in the combination of Figure 4.

Figure 9 shows a hook adapted to be used in the combinations of Figures 5 and 6.

While I have shown only the preferred form of the invention, I wish to have it understood that various changes or modifications may be made within the scope of the claims hereto attached without departing from the spirit of the invention.

In the form shown in Figure 2 my attachment comprises a disc 1 provided with a beveled cutting edge 2 and having a circular section 3 removed to accommodate a hub structure of the wheel 4 of an ordinary lawn mower. A plurality of radial slots 6 are symmetrically arranged in the body portion of the disc and are adapted to receive the shanks 7 of the hooks 8 therein. The hooks 8 are formed for engagement with an inside element of the wheel as, for instance, the inner edge 11 of the wheel rim. If assembled as shown in Figure 1 the shank portion of the hook is placed on the outside of the wheel rim so that the bent portion 12 catches the inner edge of the rim while the shank extends through one of the slots 6 in the disc and a wing nut 13 is tightened upon the shank for drawing the disc into intimate contact with the outer face of the wheel 4 and for holding it there. The slots 6 are elongated radially of the disc for the purpose of allowing a given disc to be attached to wheels of various sizes, but where the disc is made for a certain wheel circular perforations 14 may be substituted as shown in Figure 3.

It may be deemed more desirable, particularly where the wheel is formed with spokes as at 16 in Figure 6, to utilize the latter for securing the hooks. In the latter case the hook 17 illustrated in Figure 9 is preferably used, and this hook may also be used in the case of Figure 5 where the shank is placed inside of the rim instead of against the outside thereof.

The manner of attaching and removing the device is exceedingly simple, it only being necessary to press the disc against the outside of the wheel, to introduce the hooks and to tighten the nuts upon the same. The disc is made of a suitable size to extend preferably about 2″ beyond the periphery of the wheel.

In use, the lawn mower, with the attachment secured to one wheel, is placed on the sidewalk 18, the cutting edge 2 seated between the walk and the lawn, and the lawn mower propelled along the edge of the lawn. The overhanging grass and sod is thereby evenly trimmed off, leaving a straight edge which is more sightly than that obtained by the use of hand tools.

Having described my invention, I claim:—

1. The combination with a lawn mower having a traction wheel, of a cutter detachably secured to said wheel, said cutter comprising a disc having a cutting edge around its periphery and having a central opening, radially spaced means for securing said cutter to said wheel, said cutter having radially spaced openings through which said means extend, said means comprising L-shaped bolts for abutting the inner surface of said wheel, and nuts adapted to be screwed upon said bolts and into abutting engagement with said cutter.

2. A lawn mower attachment comprising a circular cutter adapted to be placed against the outer face of a lawn mower wheel, said cutter having perforations therein, hooks adapted to engage the inner portion of the wheel and extending through perforations in the cutter and nuts adapted for threaded engagement with the outward end of the hooks for drawing the cutter toward the outer face of the wheel and for holding it in place.

3. A sod cutting attachment for a lawn mower, comprising a disc having a large central aperture and a plurality of radial slots, a beveled edge at the periphery of said disc, and hooks adapted to extend through said slots and engage the rim of the lawn mower wheel.

4. A device of the class described, comprising a disc having a large central aperture and a plurality of smaller apertures disposed around the central aperture, a beveled edge at the periphery of said disc, hooks adapted to extend through said smaller apertures and engage the wheel of a lawn mower, and nuts on said hooks to hold them in place, said disc being of larger diameter than the wheel.

5. A combination with a lawn mower, of a cutter having apertures therein so disposed as to adapt the cutter to be placed against the outer face of the lawn mower wheel, hooks for engaging the wheel, and means related to the hooks for drawing the cutter toward the outside face of the wheel.

In testimony whereof I affix my signature.

IVAN LIVINGSTON.